United States Patent
Matsunaga (10) Patent No.: US 10,567,607 B2
(45) Date of Patent: Feb. 18, 2020

(54) PRINTER APPARATUS AND CONTROL METHOD OF PRINTER APPARATUS

(71) Applicant: CANON KABUSHIKI KAISHA, Tokyo (JP)

(72) Inventor: Daisuke Matsunaga, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/953,897

(22) Filed: Apr. 16, 2018

(65) Prior Publication Data
US 2018/0309891 A1  Oct. 25, 2018

(30) Foreign Application Priority Data
Apr. 20, 2017 (JP) .................................. 2017-083763

(51) Int. Cl.
| H04N 1/00 | (2006.01) |
| G06F 3/12 | (2006.01) |
| H04N 1/23 | (2006.01) |

(52) U.S. Cl.
CPC ....... *H04N 1/00891* (2013.01); *G06F 3/1207* (2013.01); *G06F 3/1221* (2013.01); *G06F 3/1239* (2013.01); *G06F 3/1259* (2013.01); *H04N 1/233* (2013.01); *H04N 1/2315* (2013.01)

(58) Field of Classification Search
CPC .......................... H04N 1/00891; G06F 3/1207
See application file for complete search history.

(56) References Cited

U.S. PATENT DOCUMENTS

| 6,477,654 | B1 * | 11/2002 | Dean ..................... | G06F 1/3203 713/300 |
| 8,675,226 | B2 * | 3/2014 | Gha ....................... | G06F 3/1221 358/1.15 |
| 2009/0310177 | A1 * | 12/2009 | Takahashi .......... | G03G 15/5004 358/1.15 |
| 2010/0166448 | A1 * | 7/2010 | Mikami ............. | G03G 15/5004 399/88 |

FOREIGN PATENT DOCUMENTS

JP  2010-156862 A  7/2010

* cited by examiner

*Primary Examiner* — Ibrahim Siddo
(74) *Attorney, Agent, or Firm* — Carter, DeLuca & Farrell LLP (57) ABSTRACT

It is possible to perform power control of a printer apparatus for each function module without increasing the circuit scale. A printer apparatus including: a printer unit configured to print an image on a printing medium; a printer control unit configured to control an operation of the printer unit; and a semiconductor integrated circuit performing image processing for input image data and having a first image processing module that performs image processing based on characteristics of the printer unit and a second image processing module that performs image processing independent of characteristics of the printer unit, and power control of the first image processing module of the semiconductor integrated circuit is performed by the printer control unit.

19 Claims, 6 Drawing Sheets

| Power mode | System Power control Unit | Controller Unit | Image Processing unit | Printer unit |
|---|---|---|---|---|
| Power source OFF state | OFF | OFF | OFF | OFF |
| cold boot transitional state | ON | OFF | OFF | OFF |
| deep sleep state | ON | ON | OFF | OFF |
| standby or Send job execution state | ON | ON | ON | OFF |
| Print job execution state | ON | ON | ON | ON |

FIG.3

| Job execution state | CONTROL BY CPU OF IMAGE PROCESSING UNIT ||| CONTROL BY CUP OF PRINTER UNIT |||
| --- | --- | --- | --- | --- | --- | --- |
| | Scanner image processing unit | Editing-related image processing unit | Printer image processing unit A | Printer image processing unit B | Printer communication I/F |
| standby (no job) | OFF | OFF | OFF | OFF | OFF |
| copy job | ON | ON/OFF | ON | ON | ON |
| ScanToSend job | ON | ON | OFF | OFF | OFF |
| PDL job | OFF | ON/OFF | ON | ON | ON |

PRINTER APPARATUS AND CONTROL METHOD OF PRINTER APPARATUS

BACKGROUND OF THE INVENTION

Field of the Invention

The present invention relates to power control in a printer apparatus mounting an integrated circuit having a plurality of chips.

Description of the Related Art

In recent years, in a printer apparatus represented by an MFP (Multifunction Peripheral), there is a tendency for power consumption at the time of normal use to increase. Consequently, in order to reduce power consumption, a system has been proposed that is capable of shutting off a source of electric power supply to a substrate and a device installed on the substrate for each kind of power mode from a CPLD (see Japanese Patent Laid-Open No. 2010-156862).

Further, in recent years, as the semiconductor process evolves, there is a tendency for a plurality of chips (function modules) to be shrunk and for a large number of function modules to be concentrated on one device for cost reduction and power saving. In order to make an attempt to further save power in a system mounting such a device, it is necessary to perform power control for each function module within the device, not for each device.

However, in the case where the CPLD alone is caused to take charge of power control for each function module, which is complicated and detailed control, there is a possibility that the circuit scale of the CPLD increases.

Consequently, an object of the present invention is to provide a printer apparatus capable of performing power control for each function module without increasing the circuit scale.

SUMMARY OF THE INVENTION

The printer apparatus according to the present invention includes: a printer unit configured to print an image on a printing medium; a printer control unit configured to control an operation of the printer unit; and a semiconductor integrated circuit performing image processing for input image data and having a first image processing module that performs image processing based on characteristics of the printer unit and a second image processing module that performs image processing independent of characteristics of the printer unit, and power control of the first image processing module of the semiconductor integrated circuit is performed by the printer control unit.

Further features of the present invention will become apparent from the following description of exemplary embodiments with reference to the attached drawings.

DESCRIPTION OF THE EMBODIMENTS

In the following, embodiments for embodying the present invention are explained by using the drawings. The configurations shown in the following embodiments are merely exemplary and the present invention is not limited to the configurations shown schematically.

First Embodiment

Figure 1:
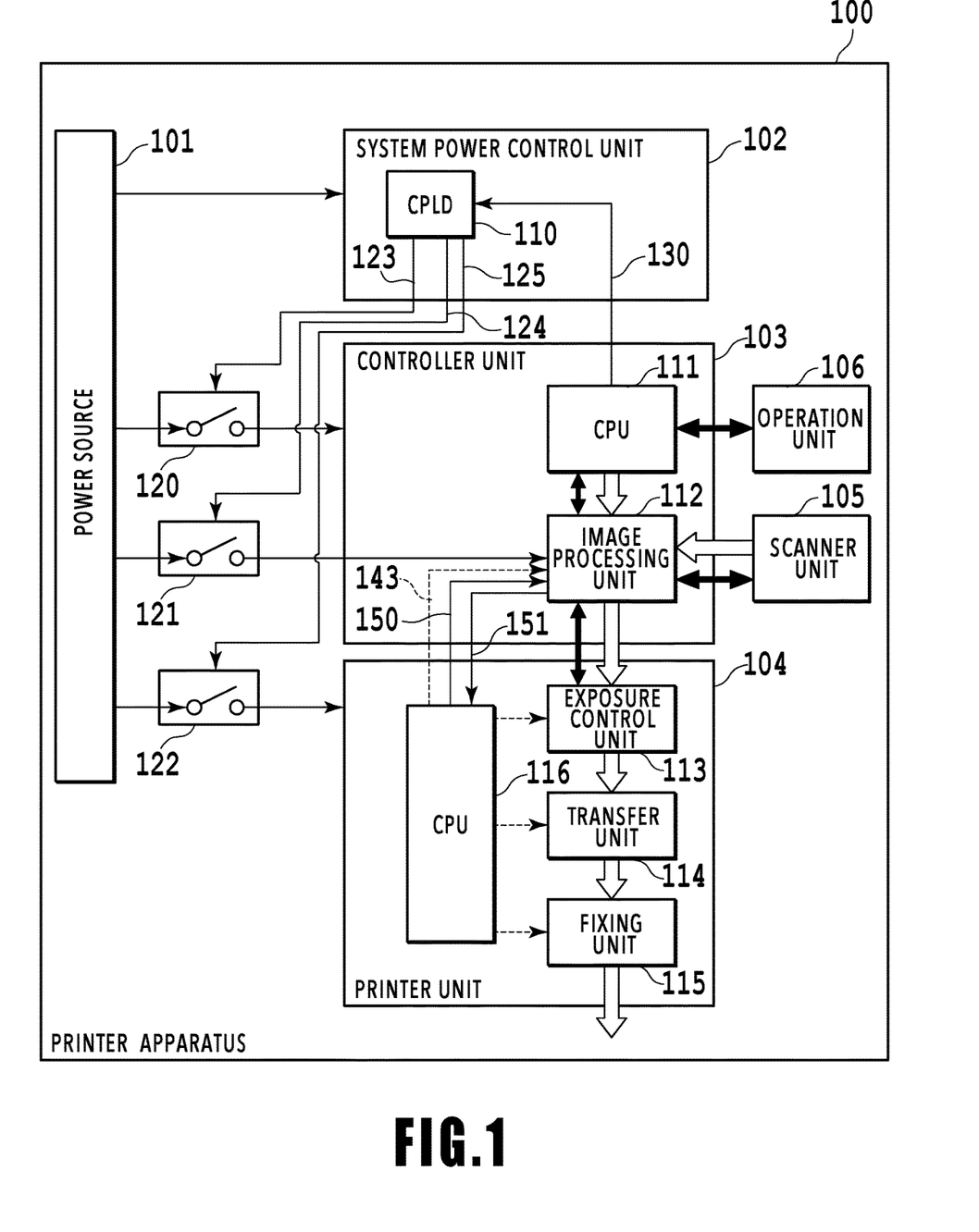
FIG. 1 is a block diagram for explaining a system configuration of a printer apparatus in a first embodiment of the present invention.

FIG. 1 is a block diagram for explaining a system configuration of a printer apparatus 100 in a first embodiment of the present invention.

The printer apparatus 100 in the present embodiment includes a power source 101, a system power control unit 102, a controller unit 103, a printer unit 104, a scanner unit 105, and an operation unit 106. The power source 101 supplies power to each unit making up the printer apparatus 100. The system power control unit 102 has a CPLD 110. The system power control unit 102 performs control of supply and shutoff of power to the controller unit 103, an image processing unit 112 possessed by the controller unit 103, and the printer unit 104 by controlling switches 120, 121, and 122. It is possible for the system power control unit 102 to control supply and shutoff of power for each physical device, such as a substrate and a chip. The CPLD 110 controls the switches 120, 121, and 122 via power control signals 123, 124, and 125 in the case where a power source is supplied from the power source 101 at the time of system boot. Due to this, it is possible for the CPLD 110 to control power supply to the controller unit 103, the image processing unit 112, and the printer unit 104. Further, the CPLD 110 controls the switches 120, 121, and 122 individually in accordance with a power control signal 130 from a CPU 111 possessed by the controller unit 103 after the system boot. Due to this, it is made possible to partially supply power to the controller unit 103, the image processing unit 112, and the printer unit 104.

As described previously, the controller unit 103 has the CPU 111 and the image processing unit 112. The controller unit 103 performs control of the entire printer apparatus 100 after the system boot. In the present embodiment, the controller unit 103 performs power control of each unit of the printer apparatus 100 via the CPLD 110, performs communication with peripheral devices (the operation unit 106 and the scanner unit 105), performs control of peripheral devices, performs image processing, and so on.

As described previously, the CPU 111 gives power supply instructions to the CPLD 110 via the power control signal 130. Further, upon receipt of instructions to start a copy job or a Send job via the operation unit 106, the CPU 111 instructs the image processing unit 112 to perform the copy job or the Send job. Here, the Send job is a job to read image data stored in a storage device, such as a DDR memory 220, and to transmit the read image data to a specified destination. Further, upon receipt of instructions to start a Print job from a network interface (network I/F), not shown schematically, the CPU 111 transfers PDL data received along with the instructions to the image processing unit 112 and instructs the image processing unit 112 to perform the Print job.

The image processing unit 112 is connected with the scanner unit 105 and the printer unit 104 and performs necessary image processing for image data that is input from the scanner unit 105 and image data that is output to the printer unit 104. Details of the image processing that is performed by the image processing unit 112 will be described later.

The printer unit 104 has an exposure control unit 113, a transfer unit 114, a fixing unit 115, and a CPU 116 and outputs (prints) image data that is transferred from the controller unit 103 on a printing medium (in the present embodiment, a sheet). The exposure control unit 113, the transfer unit 114, and the fixing unit 115 each have a motor and the CPU 116 performs load control of these motors. Further, the CPU 116 performs processing control (parameter setting and the like) of each image processing module inside the image processing unit 112 via a control line 143. As described above, the CPU 116 in the present embodiment functions as a printer control unit configured to control the operation of the printer unit 104.

Figure 2:
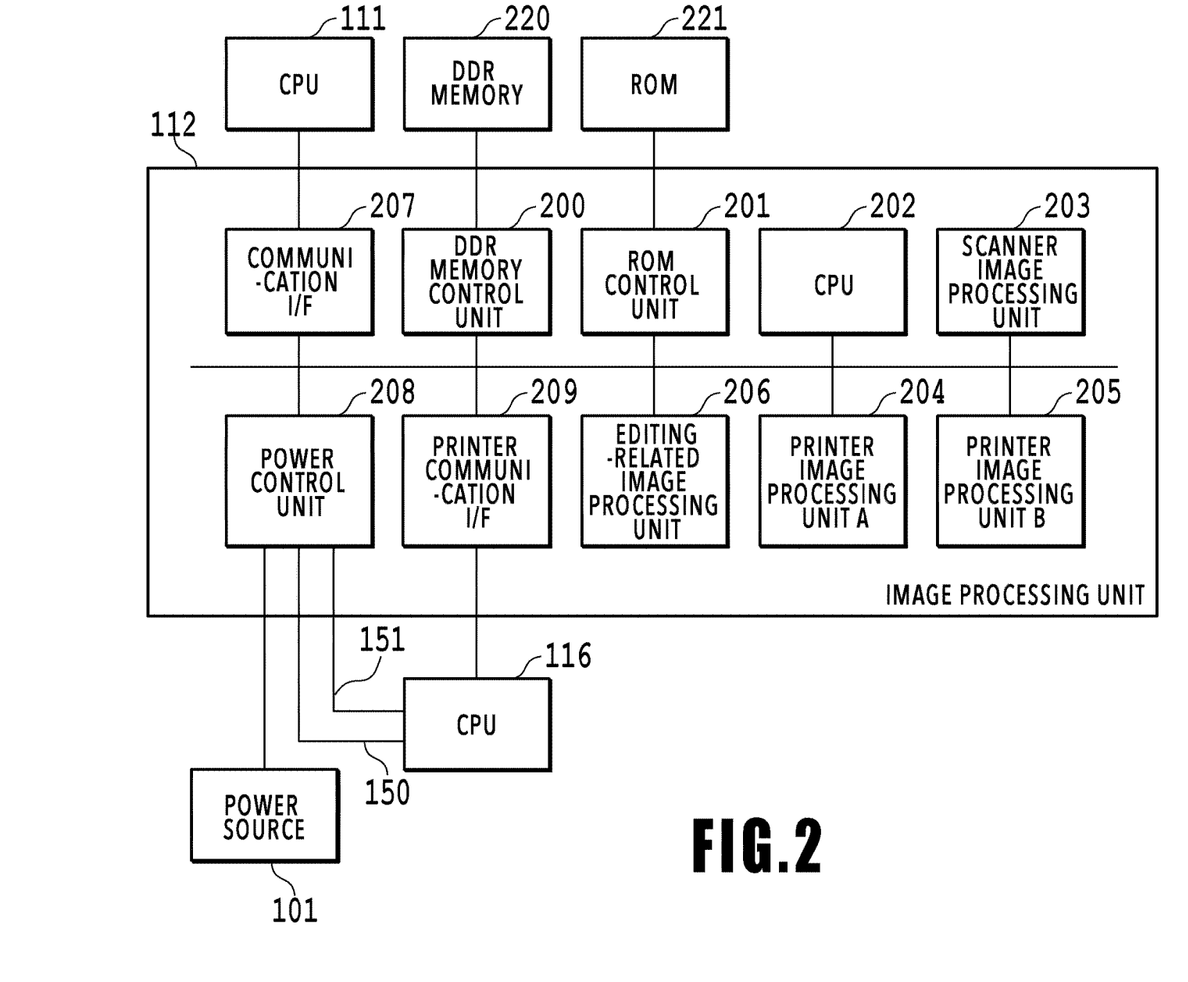
FIG. 2 is a block diagram for explaining an internal configuration of an image processing unit.

FIG. 2 is a block diagram for explaining an internal configuration of the image processing unit 112. The image processing unit 112 has a DDR memory control unit 200, a ROM control unit 201, a CPU 202, a communication interface (communication I/F) 207, a power control unit 208, and a printer communication interface (printer communication I/F) 209. Further, the image processing unit 112 has a scanner image processing unit 203, a printer image processing unit A 204, a printer image processing unit B 205, and an editing-related image processing unit 206. The CPU 202 is in charge of power control inside the image processing unit 112 and control of image processing. In the case where power is supplied to the image processing unit 112 and reset is canceled, the CPU 202 first starts a program fetch from a ROM 221 via the ROM control unit 201. Then, the CPU 202 performs initialization processing of the DDR memory control unit 200 and the DDR memory 220 and sets the operation of the DDR memory 220 effective. After this, the CPU 202 starts communication with external devices (the CPU 111 and the like) and control of each function module, such as an image processing module, inside the image processing unit 112. The scanner image processing unit 203 is connected with the scanner unit 105 shown in FIG. 1 and performs scan image processing. The printer image processing unit A 204 and the printer image processing unit B 205 are connected with the printer unit 104 and perform print image processing. The printer image processing unit A 204 performs image processing that does not depend on the characteristics of the printer unit 104. For example, the printer image processing unit A 204 performs image processing generally necessary to output a favorable image expected by a user in the printer unit 104. More specifically, the printer image processing unit A 204 performs image processing, such as color space conversion processing, screen processing, and color balance processing, in the case where the printer unit 104 is an electrophotographic unit. On the other hand, the printer image processing unit B 205 performs processing to reflect the characteristics of the printer unit 104, such as the state and the individual difference of the printer unit 104, in the image processing parameter. For example, in the case where a polygon mirror is included in the exposure control unit 113, there is a case where the rotation unevenness of the polygon mirror, the inclination of the polygon surface, and so on, affect image formation due to the device individual difference. The printer image processing unit B 205 performs image processing, such as correction, to reduce the influence such as this on image formation. The editing-related image processing unit 206 performs image processing that is used in common in scan processing, print processing, and other pieces of processing (transmission processing in the Send job and the like), such as rotation processing and scaling processing of an image. The communication I/F 207 is connected with the CPU 111 and the image processing unit 112 and the CPU 111 perform communication via the communication I/F 207. The printer communication I/F 209 is connected with the CPU 116 and the image processing unit 112 and the CPU 116 perform communication via the printer communication I/F 209. The power control unit 208 performs power control for each function module inside the image processing unit 112. The power control unit 208 receives instructions from the CPU 202 and instructions from the CPU 116 via a power control signal 150 and controls ON/OFF of power of the function modules other than the power control unit 208 inside the image processing unit 112. Due to this, in the present embodiment, it is no longer necessary for the CPLD 110 to perform power control of each function module inside the image processing unit 112. Because of this, it is made possible to perform power control of the image processing unit 112 for each function module without increasing the circuit scale of the CPLD 110.

As described previously, the CPU 116 performs control of the exposure control unit 113 included in the printer unit 104. For example, the CPU 116 performs processing control (parameter setting) of the printer image processing unit B 205 inside the image processing unit 112 via the printer communication I/F 209 by using parameters, such as the rotation state of the polygon mirror included in the exposure control unit 113 and the inclination of the polygon surface. As described above, in the present embodiment, processing control of the printer image processing unit B 205 is performed by the CPU 116 outside the image processing unit 112, not by the CPU 202 inside the image processing unit 112. However, in the case where the CPU 202 inside the image processing unit 112 performs power control of the printer image processing unit B 205 in such a configuration, processing control and power control of the printer image processing unit B 205 are performed by the different CPUs. Consequently, there is a possibility that the timing of processing control and the timing of power control for the printer image processing unit B 205 shift from each other. Due to this, for example, a situation may occur in which power supply is continued during the period of time in which the printer image processing unit B 205 is not performing processing or processing control by the CPU 116 outside the image processing unit 112 is postponed. Consequently, there is a possibility that unnecessary power is consumed or the processing performance is reduced.

Consequently, in the present embodiment, the CPU 116 performs power control of the printer image processing unit B 205 and the printer communication I/F 209. Specifically, the CPU 116 instructs the power control unit 208 to start and stop power supply to the printer image processing unit B 205 and the printer communication I/F 209 via the power control signal 150. Further, the CPU 116 detects that it is made possible to access each of the printer image processing unit B 205 and the printer communication I/F 209 because power supply and clock supply are performed for both by a power control signal 151. By control via these signals, it is possible for the CPU 116 to perform power control of the printer image processing unit B 205 at the timing at which processing control of the printer image processing unit B 205 is necessary, and therefore, it is made possible to reduce wasteful power consumption. Further, it is made possible to prevent a reduction in the processing performance.

Depending on the kind of printer apparatus, such as a type whose productivity is low and which does not comparatively require the performance of real-time processing, it is also possible to adopt a configuration in which the CPU 116 is not installed and the CPU 202 controls the printer unit 104. At this time, processing control of the printer image processing unit B 205 is performed by the CPU 202. In the configuration such as this, in order to easily implement detailed power control for the printer image processing unit B 205, it is necessary for the CPU 202 to be also capable of power control of the printer image processing unit B 205. Because of this, the power control unit 208 may have a configuration in which it is possible to switch between receiving instructions to perform power control for the printer image processing unit B 205 from the external CPU 116 via the power control signal 150 and receiving the instructions from the internal CPU 202 via the system bus.

Figure 3:
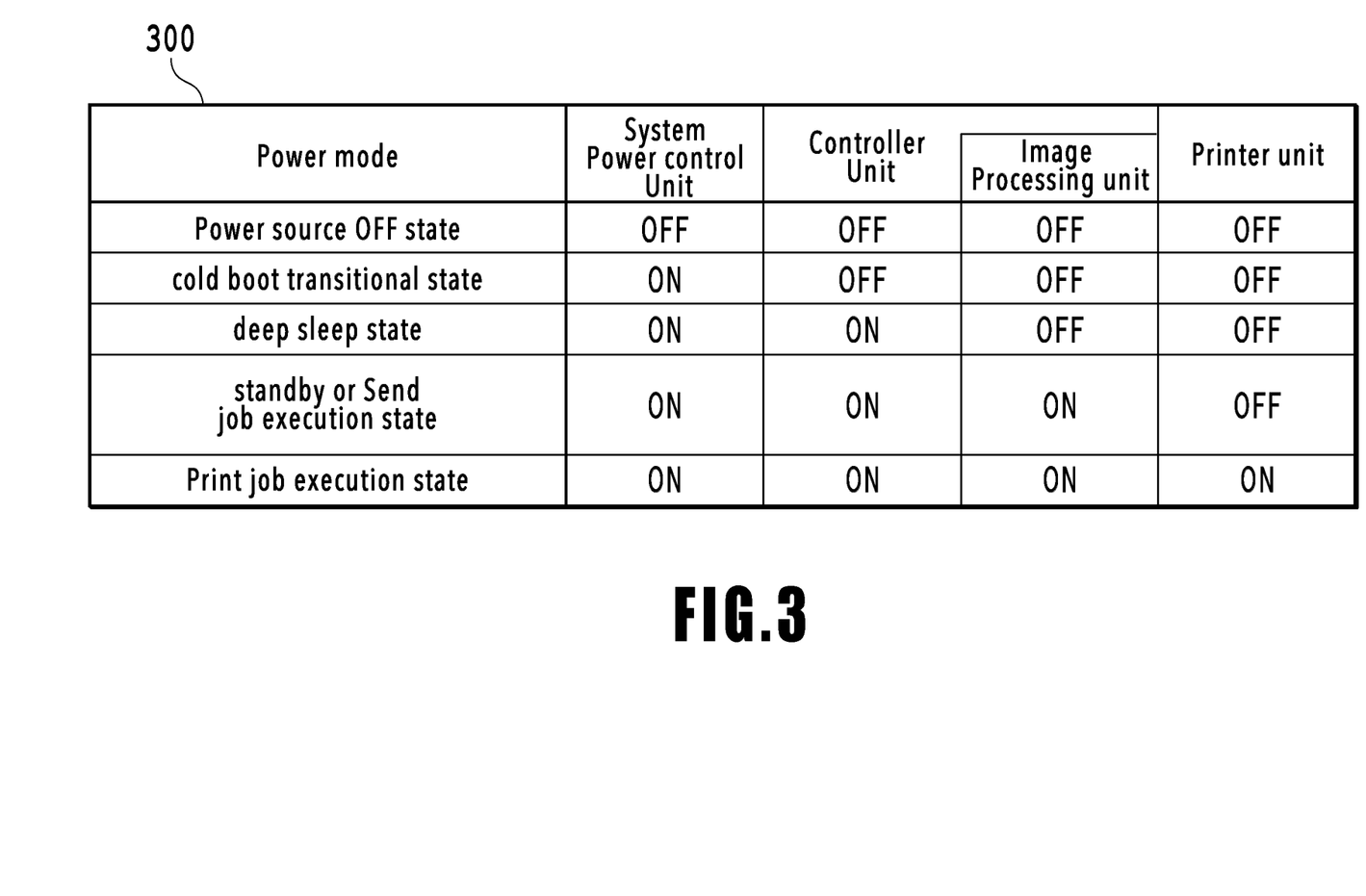
FIG. 3 is a diagram showing a correspondence between a power mode of the printer apparatus and a power supply state of a device whose power control is performed by a CPLD.

FIG. 3 shows a table 300 in which the power mode possessed by the printer apparatus 100 and the power supply state of the device whose power control is performed by the CPLD 110 are associated with each other. In the present embodiment, five power modes are provided in which the printer apparatus 100 is brought into a power source OFF state, a cold boot transitional state, a deep sleep state, a standby or Send job execution state, and a Print job execution state. The power source OFF state is a state where power supply to all the components included in the printer apparatus 100 is shut off. The cold boot transitional state is a state where power is supplied from the power source 101 only to the system power control unit 102. The deep sleep state is a state where power is supplied also to the controller unit 103, in addition to the system power control unit 102. No power is supplied to the image processing unit 112 of the controller unit 103. As shown in FIG. 1, as for the image processing unit 112 mounted on the controller unit 103, power supply control by the switch 121 is also performed separately from power supply control of the controller unit 103 by the switch 120. Because of this mechanism, it is made possible to shut off power supply to the image processing unit 112 while making it possible for the CPU 111 to operate, and therefore, it is made possible to implement the deep sleep state where the system operation can be maintained with required minimum power. In the standby or Send job execution state, power is also supplied to the image processing unit 112, in addition to the controller unit 103. Due to this, for example, during standby, it is possible to generate image data that is output to the operation unit 106. Further, for example, it is possible to perform image processing necessary for Send job execution (for example, image processing by the editing-related image processing unit 206) without supplying power to the printer unit 104 or the scanner unit 105 at the time of Send job execution. The Print job execution state is a state where power is supplied to all the components included in the printer apparatus 100.

Figure 4:
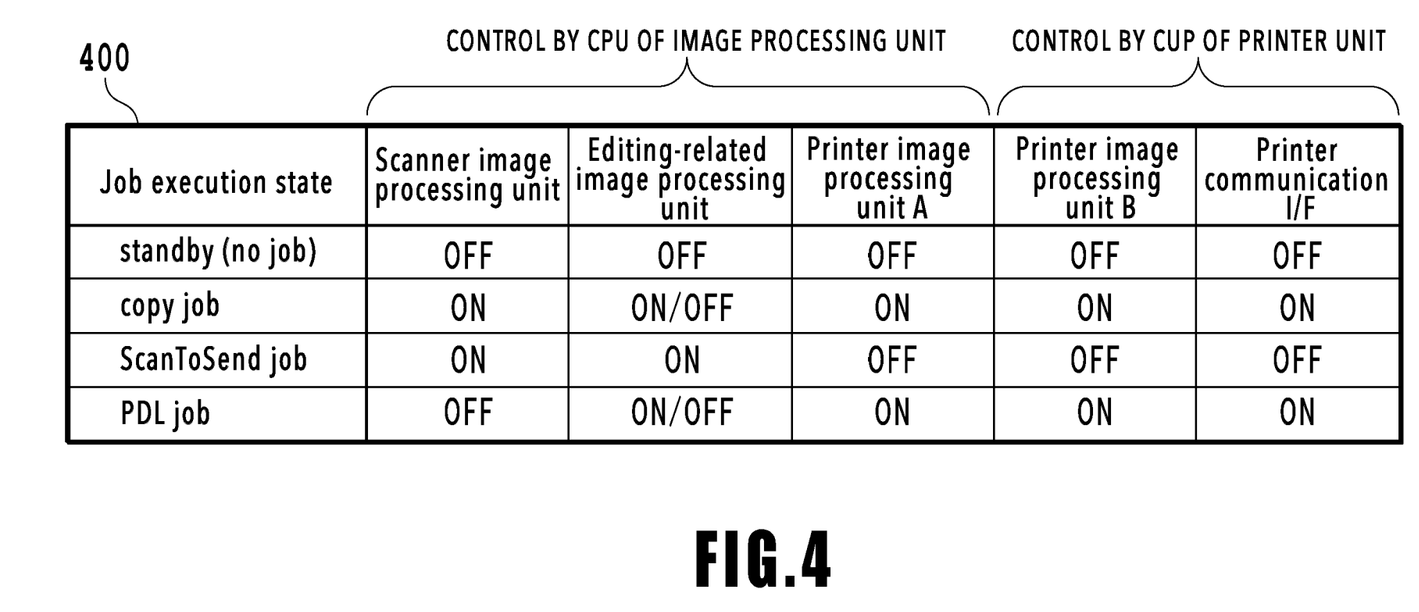
FIG. 4 is a diagram showing a correspondence between a job execution state of the image processing unit and a power supply state of each function module of the image processing unit.

FIG. 4 shows a table 400 showing a power supply state of each function module at the time of power being supplied to the image processing unit 112, that is, at the time of the power mode being the standby or Send job execution state or the Print job execution state. Here, each module refers to the scanner image processing unit 203, the editing-related image processing unit 206, the printer image processing unit A 204, the printer image processing unit B 205, and the printer communication I/F 209. In the following, there is a case where the function module is represented simply as a module. As shown in FIG. 4, the power supply state of each module of the image processing unit 112 changes depending on the job being performed. For example, in the standby state (state where no job is being performed), power supply to each module is shut off. In the execution state of a copy job, power is supplied to each module and it is made possible to perform the scan image processing and the print image processing. As for the editing-related image processing unit 206, power is supplied only in the case where editing-related image processing, such as rotation processing and scaling processing, is necessary. Power control of the scanner image processing unit 203, the editing-related image processing unit 206, and the printer image processing unit A 204 is performed by the CPU 202 giving instructions to the power control unit 208. On the other hand, power control of the printer image processing unit B 205 and the printer communication I/F 209 is performed by the external CPU 116 giving instructions to the power control unit 208 via the power control signal 150. In the execution state of a scan transmission (ScanToSend) job, the print image processing is not necessary, and therefore, power to the printer image processing unit A 204, the printer image processing unit B 205, and the printer communication I/F 209 is shut off. The ScanToSend job refers to a job to transmit image data obtained by reading an image of a document via the scanner unit 105 to an external device via a network I/F and the like, not shown schematically. In the PDL job execution state, the scan image processing is not necessary, and therefore, power supply to the scanner image processing unit 203 is shut off. The PDL job refers to a job to cause the printer unit 104 to print an image in accordance with the PDL data received from an external device via a network I/F and the like, not shown schematically.

As described above, in the present embodiment, as for power supply for each device, the CPLD 110 controls the power supply state of each device in accordance with the power mode of the printer apparatus 100 as shown in FIG. 3. On the other hand, power control of each module of the image processing unit 112 is performed dynamically by the CPU 202 and the CPU 116 in accordance with a job that is performed.

Figures 5, 5A:
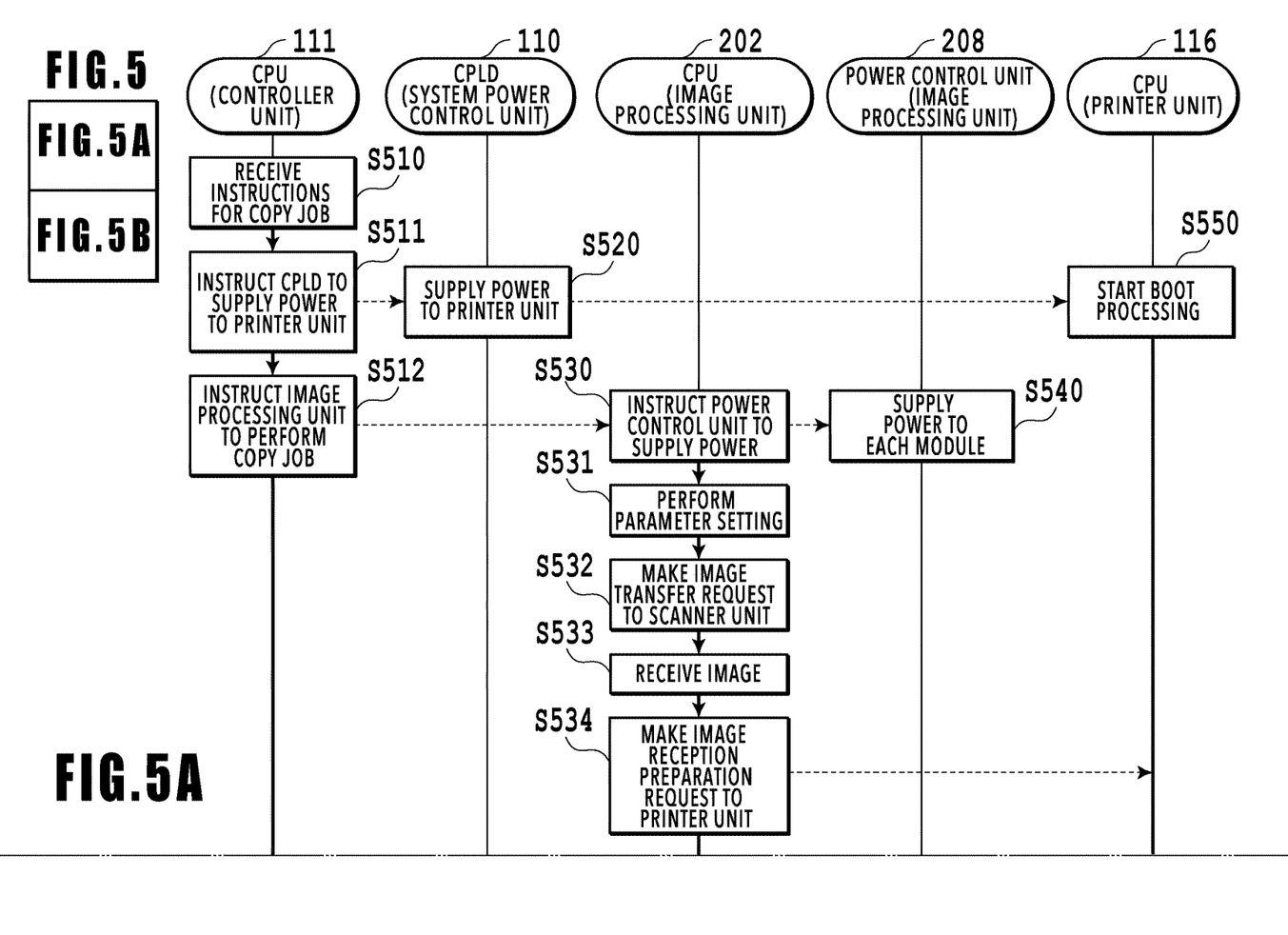
FIG. 5 is a diagram showing the relationship between FIG. 5A and FIG. 5B.
FIGS. 5A and 5B are sequence diagrams showing a flow of processing of the printer apparatus in the first embodiment in the case where a copy job is input during standby.
Figure 5B:
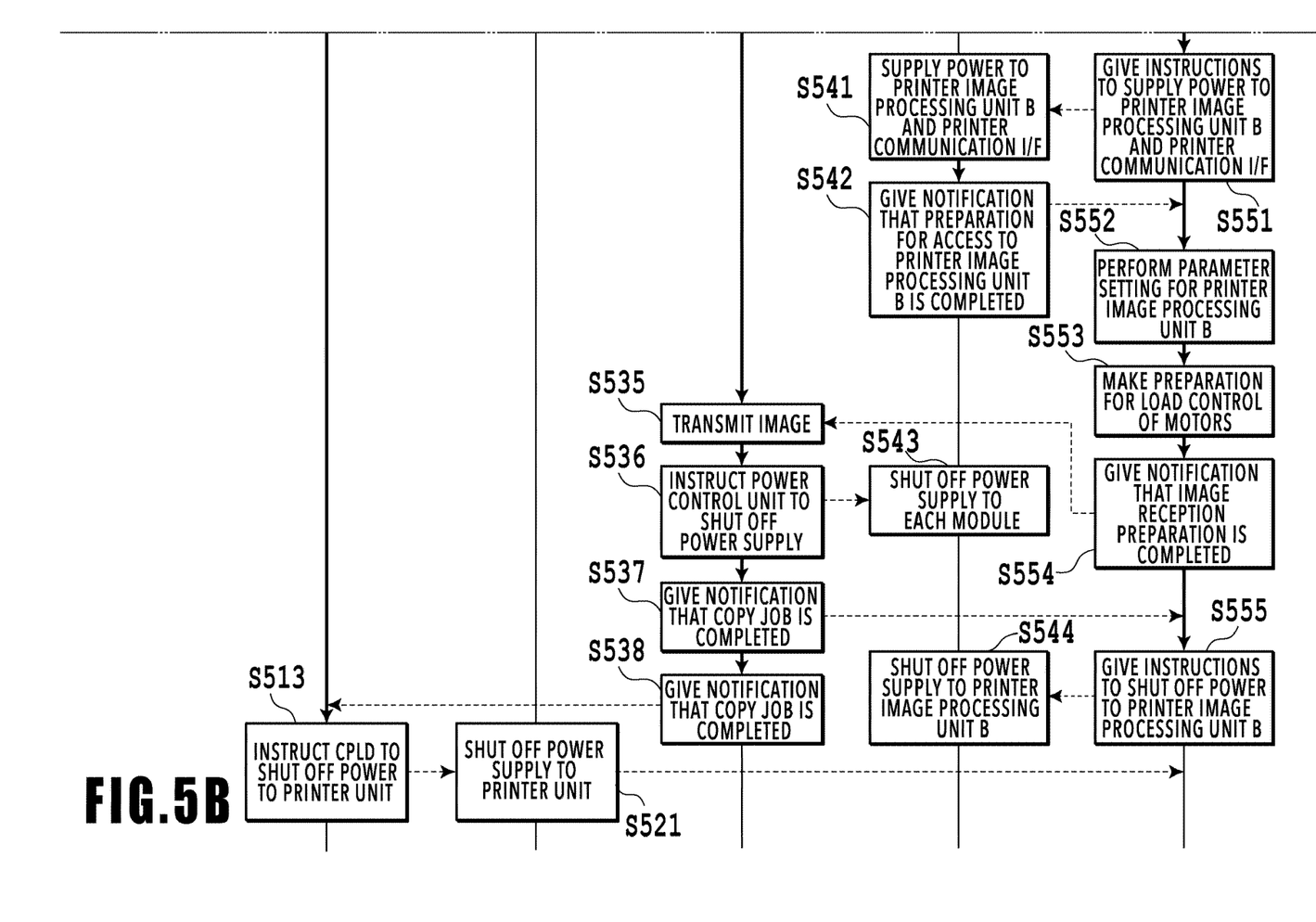

FIGS. 5A and 5B are sequence diagrams showing a flow of processing of the printer apparatus 100 in the first embodiment in the case where a copy job is input during standby. In the sequence diagram shown in FIGS. 5A and 5B, processing of the CPU 111, the CPLD 110, the CPU 202, the power control unit 208, and the CPU 116 is shown. A broken-line arrow in the horizontal direction in FIGS. 5A and 5B shows the way transition of control or communication is performed. Further, a solid-line arrow in the vertical direction in FIGS. 5A and 5B shows transition of processing inside the device.

First, the state of each device within the printer apparatus 100 during standby is the state shown in FIG. 3. Further, the power supply state of each module inside the image processing unit 112 is the state shown in FIG. 4. In this state, in the case where a user inputs a copy job via the operation unit 106, the CPU 111 receives instructions to perform the copy job (step S510). Then, the CPU 111 instructs the CPLD 110 to start power supply to the printer unit 104 (step S511). Upon receipt of the instructions, the CPLD 110 inputs the power control signal 125 to start power supply to the printer unit 104 to the switch 122 (step S520). Due to this, power supply to the printer unit 104 is started. Then, the CPU 116 of the printer unit 104 starts boot processing and performs initialization processing of the CPU 116 (step S550). Due to this, the power mode of the printer apparatus 100 makes a transition from the standby or Send job execution state to the Pint Job execution state.

After this, the CPU 111 having instructed the CPLD 110 to start power supply to the printer unit 104 instructs the image processing unit 112 to perform the copy job (step S512). Then, the CPU 202 of the image processing unit 112 instructs the power control unit 208 to start power supply to each module (step S530). Here, it is assumed that the CPU 202 gives instructions to start power supply to the module necessary to perform the copy job, that is, the scanner image processing unit 203 and the printer image processing unit A 204. The power control unit 208 having received the instructions starts power supply to those modules (step S540). Following the above, the CPU 202 performs parameter setting for the scanner image processing unit 203 and the printer image processing unit A 204 for which the instructions to start power supply have been given at step S530 (step S531). Further, the CPU 202 makes an image transfer request to the scanner unit 105 (step S532). Then, the image data is transferred from the scanner unit 105 to the scanner image processing unit 203 and at the scanner image processing unit 203, image processing for the transferred image data is performed. Then, the image data after the image processing is stored in the DDR memory 220 (step S533). In the case where the scanned image data is received in this manner, the CPU 202 makes an image reception preparation request to the printer unit 104 (step S534). The image reception preparation request is a request to cause the printer unit 104 to make preparation to receive the image data (hereinafter, referred to as image reception preparation). The CPU 116 of the printer unit 104 having received the image reception preparation request from the CPU 202 instructs the power control unit 208 to start power supply to the printer image processing unit B 205 and the printer communication I/F 209 via the power control signal 150 (step S551). In response to the instructions, the power control unit 208 starts power supply to the printer image processing unit B 205 and the printer communication I/F 209 (step S541). Here, the printer image processing unit B 205 and the printer communication I/F 209 are configured so as to, in the case where power is supplied, wait for the operation clock in the PLL circuit and the DLL circuit possessed by themselves to become stable and so that the reset is canceled in the case where the operation clock becomes stable. PLL is an abbreviation of Phase Locked Loop. DLL is an abbreviation of Delay Locked Loop. In the case where the operation clock generation and the recent cancellation are performed normally, the power control unit 208 notifies the CPU 116 that the preparation to allow access to the printer image processing unit B 205 has been completed via the power control signal 151 (step S542). Hereinafter, this notification is called an access preparation completion notification.

After giving instructions to start power supply to the printer image processing unit B 205 and the printer communication I/F 209 at step S551, the CPU 116 checks whether the access preparation completion notification has been received by polling the power control signal 151. Then, upon receipt of the access preparation completion notification of the printer image processing unit B 205, the CPU 116 performs parameter setting for the printer image processing unit B 205 via the printer communication I/F 209 (step S552). As described previously, the parameter that is set here is determined by taking into consideration the state and the individual difference of the devices (the exposure control unit 113, the transfer unit 114, the fixing unit 115, and so on) included in the printer unit 104. Upon completion of the parameter setting, the CPU 116 makes preparation for load control of the motors included in the exposure control unit 113, the transfer unit 114, and the fixing unit 115 (step S553). After the preparation, it is made possible for the CPU 16 to perform control of, for example, the polygon mirror of the exposure control unit 113, the photoconductor drum of the transfer unit 114, the fixing roller of the fixing unit 115, and so on, with necessary timing. Through the above processing, the image reception preparation of the printer unit 104 is completed. Then, the CPU 116 notifies the CPU 202 that the image reception preparation is completed (step S554). In response to this notification, the CPU 202 transmits image data on the DDR memory 220 to the printer unit 104 (step S535). At the time of transmission of image data, first, the image processing by the printer image processing unit A 204 is performed for the image data on the DDR memory 220 and after this, the image processing by the printer image processing unit B 205 is performed. Then, the image data after the image processing is transferred to the printer unit 104. The image data transferred to the printer unit 104 is output to a sheet through the processing of the exposure control unit 113, the transfer unit 114, and the fixing unit 115. Due to this, the sheet on which an image is printed is discharged from the printer unit 104. In the case where there is a plurality of pages to be processed in this copy job, the CPU 202 repeats the image transmission processing at step S535 until printing of all the pages is completed. Upon completion of printing of all the pages, the CPU 202 instructs the power control unit 208 to shut off power supply to each module (step S536). Here, it is assumed that the CPU 202 gives instructions to shut off power supply to the scanner image processing unit 203 and the printer image processing unit A 204 as in the case of the instructions to start power supply at step S530. The power control unit 208 having received the instructions shuts off power supply to those modules (step S543).

After this, the CPU 202 notifies the CPU 116 of the printer unit 104 of completion of the copy job (step S537). The CPU 116 of the printer unit 104 having received the completion notification of the copy job instructs the power control unit 208 of the image processing unit 112 to shut off power supply to the printer image processing unit B 205 via the power control signal 150 (step S555). The power control unit 208 having received the instructions shuts off power supply to the printer image processing unit B 205 (step S544). After this, the CPU 202 also notifies the CPU 111 of completion of the copy job (step S538). The CPU 111 having received the notification instructs the CPLD 110 to shut off power supply to the printer unit 104 after a predetermined time elapses (step S513). The CPLD 110 having received the instructions turns OFF the switch 122 via the power control signal 125 and shuts off power supply to the printer unit 104 (step S521). Due to this, the CPU 116 of the printer unit 104 stops.

As explained above, in the present embodiment, in the semiconductor integrated circuit (corresponds to the image processing unit 112) having a plurality of function modules (chips), the CPU (corresponds to the CPU 202 of the image processing unit 112) possessed by the semiconductor integrated circuit controls the start and stop of power supply to each chip. Due to this, it is no longer necessary for the CPLD 110 that performs power control for the device, such as the controller unit 103 and the printer unit 104, to perform power control for each function module. Consequently, according to the present embodiment, it is made possible to implement power control for each function module without increasing the circuit scale of the printer apparatus, particularly, the circuit scale of the CPLD that performs power control of each device.

Further, in the present embodiment, power control for the first chip (corresponds to the printer image processing unit B 205) that performs image processing in accordance with the characteristics of the printer unit is performed by the CPU (corresponds to the CPU 116) of the printer unit. Furthermore, power control for the second chip (corresponds to the image processing units 203, 204, and 206) of the chips within the semiconductor integrated circuit, which performs image processing not dependent on the characteristics of the printer unit (corresponds to the printer unit 104) is performed by the CPU of the semiconductor integrated circuit. That is, in the present embodiment, power control for the first chip whose processing control is performed by the CPU of the printer unit is performed by the CPU of the printer unit. With such a configuration, even in the case where a chip whose processing control is performed by the external CPU is included within the semiconductor integrated circuit, it is made possible to achieve synchronization between power control and processing control for the chip. Consequently, according to the present embodiment, it is made possible to prevent unnecessary power consumption and a reduction in the processing performance as described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to perform power control of a printer apparatus for each function module without increasing the circuit scale.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-083763, filed Apr. 20, 2017, which is hereby incorporated by reference wherein in its entirety.

What is claimed is:

1. A printer apparatus comprising:
   a printer which includes a plurality of devices and prints an image on a printing medium;
   a first processor which controls the plurality of devices of the printer, and sends one or more parameters corresponding to characteristics of at least one device of the plurality of devices; and
   a semiconductor integrated circuit which has a first image processing module that performs image data processing using the one or more parameters and sends image data that has been subjected to the image data processing to the first processor, a second image processing module that performs image data processing without using the one or more parameters and a second processor that controls both the image data processing by the first image processing module and the image data processing by the second image processing module,
   wherein the first processor performs a power control of the first image processing module of the semiconductor integrated circuit, and the second processor of the semiconductor integrated circuit performs a power control of the second image processing module of the semiconductor integrated circuit.

2. The printer apparatus according to claim 1, wherein the semiconductor integrated circuit further has a power control module which performs supply or shutoff of power to the first image processing module in accordance with an instruction from the first processor and supply or shutoff of power to the second image processing module in accordance with an instruction from the second processor.

3. The printer apparatus according to claim 2, further comprising:
   a scanner which generates image data by reading an image of a document, wherein
   the second image processing module processes the image data generated by the scanner, and
   the second processor gives an instruction to the power control module so that power is supplied to the second image processing module in accordance with an instruction to perform a copy.

4. The printer apparatus according to claim 1, wherein the semiconductor integrated circuit further has a communication interface that communicates with the first processor, and
   the first processor sends the one or more parameters for the image data processing corresponding to the characteristics of the at least one device to the first image processing module via the communication interface.

5. The printer apparatus according to claim 4, wherein the one or more parameters are parameters corresponding to a state of the at least one device.

6. The printer apparatus according to claim 1, wherein the at least one device is a polygon mirror, and
   the one or more parameters are parameters corresponding to a rotation state or an inclination of the polygon mirror.

7. The printer apparatus according to claim 4, wherein the first processor performs the power control of the first image processing module by using a signal line different from the communication interface.

8. The printer apparatus according to claim 3, wherein the first processor gives an instruction to the power control module so that supply of power to the first image processing module is shut off in accordance with a notification that the copy is completed.

9. The printer apparatus according to claim 2, wherein the first processor gives an instruction to the power control module so that power is supplied to the first image processing module in accordance with a predetermined request that is output from the second processor.

10. The printer apparatus according to claim 9, wherein the predetermined request is output at a time of transmission of image data.

11. The printer apparatus according to claim 1, wherein the first processor is a CPU.

12. The printer apparatus according to claim 1, wherein the second processor is a CPU.

13. The printer apparatus according to claim 1, further comprising: a power controller performs a power control of the semiconductor integrated circuit.

14. The printer apparatus according to claim 13, wherein the power controller performs a power control of the first processor.

15. The printer apparatus according to claim 13, wherein the power controller performs a power control of the plurality of devices of the printer.

16. The printer apparatus according to claim 4, wherein the first processor performs a power control of the communication interface.

17. The printer apparatus according to claim 1, wherein the second processor sends a predetermined parameter for the image data processing different from the characteristics of the at least one device to the second image processing module.

18. The printer apparatus according to claim 1, wherein supply of power to the second image processing module is shut off in accordance with a completion of a transmission of image data to the printer.

19. A control method of a printer apparatus, the printer apparatus comprising:
   a printer which includes a plurality of devices and prints an image on a printing medium;
   a first processor which controls the plurality of devices the printer, and sends one or more parameters corresponding to characteristics of at least one device of the plurality of devices; and
   a semiconductor integrated circuit which has a first image processing module that performs image data processing corresponding to the characteristics of the at least one device of the plurality of devices using the one or more parameters and sends image data that has been subjected to the image data processing to the first processor, a second image processing module that performs image data processing without using the one or more parameters and a second processor that controls both the image data processing by the first image processing module and the image data processing by the second image processing module,
   the method comprising:
      performing, by the first processor, a power control of the first image processing module of the semiconductor integrated circuit, and
      performing, by the second processor of the semiconductor integrated circuit, a power control of the second image processing module of the semiconductor integrated circuit.

* * * * *